UNITED STATES PATENT OFFICE.

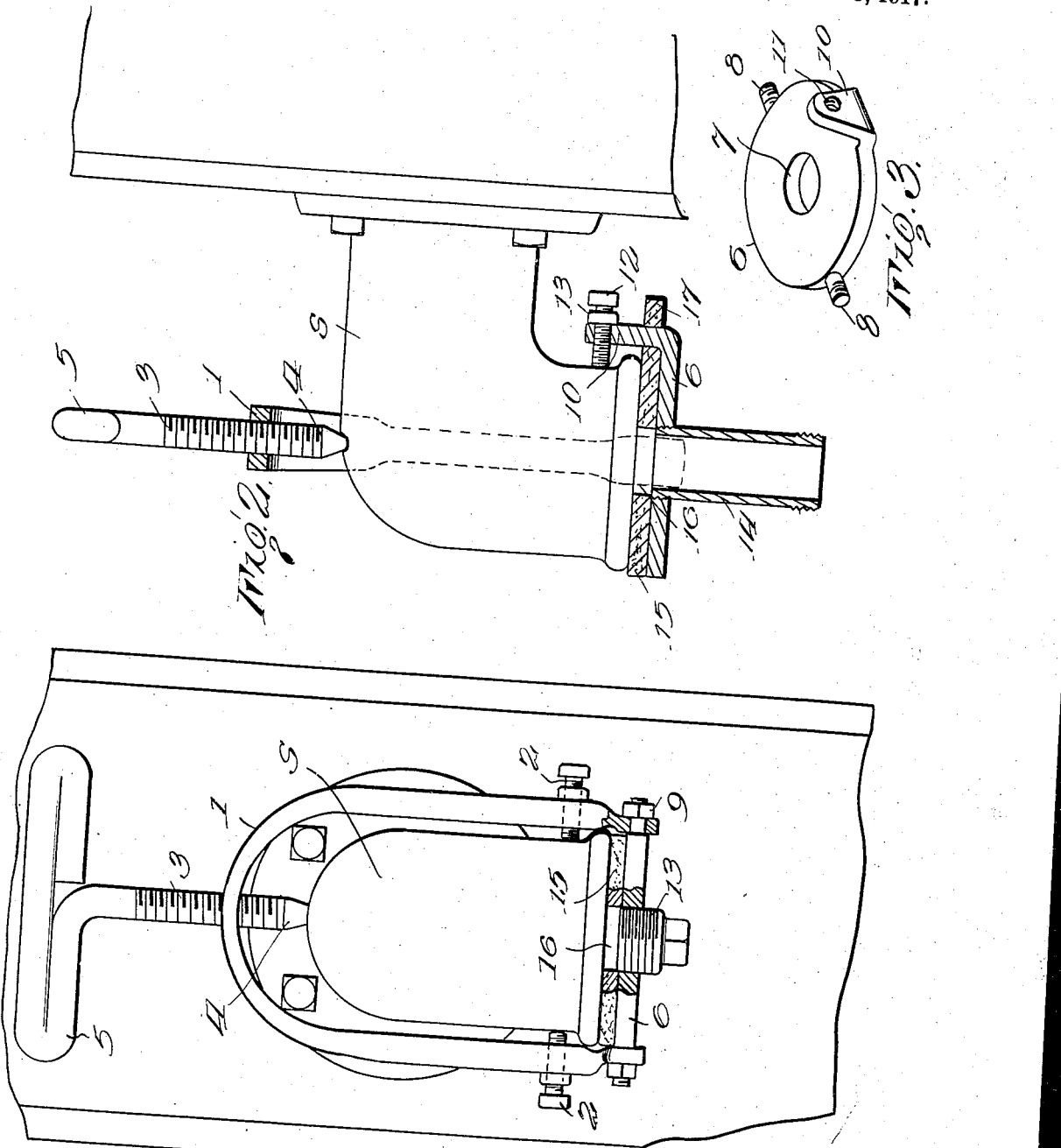

ERNEST D. BECKMAN, OF TOLNA, NORTH DAKOTA.

PUMP-SPOUT ATTACHMENT.

1,250,944.

Specification of Letters Patent.

Patented Dec. 25, 1917.

Application filed April 19, 1917. Serial No. 163,286.

*To all whom it may concern:*

Be it known that I, ERNEST D. BECKMAN, a citizen of the United States, and resident of Tolna, in the county of Nelson and State of North Dakota, have invented certain new and useful Improvements in Pump-Spout Attachments, of which the following is a specification.

This invention relates, generally, to pumps and has more especial reference to an improved spout cut off attachment therefor.

The invention has for its dominant object to provide an attachment for pump spouts whereby the flow of water therefrom can be discontinued to allow the discharging of the same to a second outlet communicating with a suitable storage tank or cistern.

Another and equally important object of the invention is to provide a cut off attachment for pumps having an outlet port therein of a size less than the pump spout whereby the pressure of the water discharged from the pump can be increased for various purposes.

In the more detailed description which is to follow, reference is made to the accompanying drawings, but it will be understood that only one form of the invention is illustrated therein and various changes and modifications can be made without departing from the spirit or scope of the invention, as defined in the appended claims.

In the drawings:

Figure 1 is a front elevation of a pump spout with my improved cut off attachment applied thereto, parts of the attachment being shown in section;

Fig. 2 is a side elevation of the spout with the cut off attachment in section; and Fig. 3 is a detail in perspective of the cut off plate of the attachment.

Referring now more particularly to the drawings and in connection with which like reference characters will designate corresponding parts throughout the several views, a substantially U-shaped frame 1 is provided and has its free extremities flattened and provided with bearing openings, the purpose of which will be subsequently apparent. Other openings are formed within the side portions of the U-shaped frame in proximity of the bearing openings therein and are screw threaded whereby set screws 2 may be turned into engagement therewith. Within the intermediate portion of the frame another screw threaded opening is formed and is adapted to have turned into engagement therewith a clamping screw 3, the lower extremity of which is tapered as at 4 while the upper extremity is bent to constitute a suitable handle 5.

A cut off plate 6 having a screw threaded opening 7 formed concentrically thereof and diametrically positioned screw threaded bearing lugs 8, the said bearing lugs being received within the openings formed in the extremities of the U-shaped frame 1 and secured therein against lateral displacement by means of locking nuts 9 turned into engagement with the screw threaded portions thereof. A lug 10 is formed upon one side of the cut off plate 6 and is bent upwardly at substantially right-angles thereto and provided with a screw threaded opening 11 whereby a set screw 12 can be turned into engagement therewith, the said set screw being locked in its adjusted position by means of a locking nut 13 arranged thereon. A screw threaded plug 13' is normally turned into engagement with the opening 7, obviously, serving to close the same, but when desired, may be removed therefrom to allow the engaging of a discharge conduit 14 therewith.

A washer 15 provided with a concentrically disposed opening 16 alining with the cut off plate opening 7 is arranged upon the said cut off plate and is formed with an apertured extension 17 receivable over the upright lug 10. By so arranging the extension 17 over the upright lug 10, it will be appreciated that lateral displacement of the washer 15 with relation to the cut off plate 6 will be obviated.

In operation the U-shaped frame 1 is arranged over the pump spout S while the cut off plate 6 is arranged over the outlet opening formed therein. By turning the clamping screw 3 the frame 6 will be drawn upwardly and as a consequence the cut off plate 6 with its respective washer 15 will be drawn tightly into engagement with the outlet portion of the said spout S. To prevent movement of the cut off plate 6 with relation to the pump spout, the set screws 2 and 12 are turned into engagement with the same directly above the lip portion formed thereon adjacent the outlet. When it is desired to cut off the flow of water from the spout S, the plug 13 is turned into engagement with the opening 7, whereupon the discharge of water will then be through that part of the pump as connected with a suitable supply tank or cistern. However, when it is desired to increase the pressure of water as discharged from the pump the plug 13 is removed from the opening 7 and the conduit 14 engaged therewith. Obviously, due to the reduced outlet the pressure of the water flowing from the spout S will be materially increased.

I claim:

1. A spout attachment including a frame, a plate pivotally engaged with the extremities of said frame, said plate having a discharge opening formed therein and an apertured extension formed upon one side thereof, a clamping screw turned into engagement with the frame at a point opposite to the mounting of the plate, clamping means passing through the apertured extension, other clamping means arranged adjacent the extremities of said frame, and means for normally closing the discharge opening in the plate.

2. A spout attachment including a substantially U-shaped frame, a plate pivotally engaged with the extremities of said frame, said plate having a discharge opening formed concentrically thereof and a lug formed thereon, a washer arranged on the plate having an apertured extension receivable over said lug, a clamping screw turned into engagement with the frame at a point opposite the mounting of the plate, other clamping means arranged adjacent the extremities of said frame and upon said lug, and means for normally closing the concentrically disposed opening in the plate.

In testimony whereof, I affix my signature hereto.

ERNEST D. BECKMAN.